United States Patent
Lindberg

(10) Patent No.: US 9,694,566 B2
(45) Date of Patent: Jul. 4, 2017

(54) MACHINE AND MANUFACTURING METHOD FOR BUILDING BOARD

(71) Applicant: Oneday Wall AB, Orebro (SE)

(72) Inventor: Peter Lindberg, Orebro (SE)

(73) Assignee: Oneday Wall AB, Orebro (SE)

( * ) Notice: Subject to any disclaimer, the term of this patent is extended or adjusted under 35 U.S.C. 154(b) by 12 days.

(21) Appl. No.: 14/761,875

(22) PCT Filed: Nov. 28, 2013

(86) PCT No.: PCT/SE2013/051409
§ 371 (c)(1),
(2) Date: Jul. 17, 2015

(87) PCT Pub. No.: WO2014/116157
PCT Pub. Date: Jul. 31, 2014

(65) Prior Publication Data
US 2015/0360456 A1 Dec. 17, 2015

(30) Foreign Application Priority Data
Jan. 28, 2013 (SE) ...................................... 1350085

(51) Int. Cl.
*B29C 65/50* (2006.01)
*B32B 37/02* (2006.01)
(Continued)

(52) U.S. Cl.
CPC ........ *B32B 37/1284* (2013.01); *B29C 63/003* (2013.01); *B30B 3/02* (2013.01);
(Continued)

(58) Field of Classification Search
USPC .. 156/71, 306.6, 306.9, 307.1, 307.3, 307.4, 156/391, 538, 539, 543, 546, 547, 556
See application file for complete search history.

(56) References Cited

U.S. PATENT DOCUMENTS 3,528,126 A * 9/1970 Ernst ....................... B29C 44/30
425/115
3,793,122 A * 2/1974 Sullhofer ................ B29C 44/30
156/289
(Continued)

FOREIGN PATENT DOCUMENTS

DE 3131183 A1 2/1983
DE 19727129 A1 1/1999
(Continued)

OTHER PUBLICATIONS

Chinese Office Action dated Jul. 12, 2016 for Application No. 201380071666.X.
(Continued)

*Primary Examiner* — Sing P Chan
(74) *Attorney, Agent, or Firm* — Moore & Van Allen PLLC; W. Kevin Ransom

(57) ABSTRACT

A building board is finished in a first processing station via laterally operating processing means, where-in a first edge strip is glued along a first edge side of body element of the building board. In a second processing station a primary surface layer is glued, by vertically operating processing means, to cover the entire primary main side and the primary side of the first edge stripe. Thereafter, a vertical pressure is applied over the body element and the first edge stripe across a working direction while the body element and the first edge stripe pass the second processing station in such a manner that a primary side of the first edge stripe is brought in level with a primary main side of the body element when passing the second processing station.

9 Claims, 5 Drawing Sheets

(51) Int. Cl.
  *B32B 37/10* (2006.01)
  *B32B 37/20* (2006.01)
  *B32B 37/22* (2006.01)
  *B32B 38/04* (2006.01)
  *B32B 38/18* (2006.01)
  *B32B 43/00* (2006.01)
  *B32B 37/12* (2006.01)
  *B30B 3/02* (2006.01)
  *B29C 63/00* (2006.01)
  *E04F 13/08* (2006.01)
  *B32B 37/00* (2006.01)

(52) U.S. Cl.
  CPC ............ *B32B 37/10* (2013.01); *B32B 37/226* (2013.01); *E04F 13/0866* (2013.01); *B32B 37/0053* (2013.01); *B32B 2317/16* (2013.01); *B32B 2607/02* (2013.01); *Y10T 156/17* (2015.01)

(56) References Cited

U.S. PATENT DOCUMENTS

| | | | | |
|---|---|---|---|---|
| 4,581,186 A | * | 4/1986 | Larson | ............... B29C 44/1233 264/145 |
| 5,545,279 A | | 8/1996 | Hall et al. | |
| 5,879,486 A | * | 3/1999 | Philips | ............... B28B 19/0092 156/39 |
| 5,966,885 A | | 10/1999 | Chatelain | |
| 5,975,180 A | * | 11/1999 | Durinck | ............... B31D 3/0284 156/197 |
| 2009/0110920 A1 | | 4/2009 | Bordener | |

FOREIGN PATENT DOCUMENTS

| | | |
|---|---|---|
| EP | 0327261 A1 | 8/1989 |
| EP | 0344410 A2 | 12/1989 |
| EP | 2177355 A2 | 4/2010 |
| GB | 1078736 A | 8/1967 |
| GB | 1159114 A | 7/1969 |
| GB | 2104448 A | 3/1983 |
| JP | 2005029334 A | 2/2005 |
| SE | 368847 B | 7/1974 |
| SE | 1150266 A1 | 8/2012 |
| WO | WO 9733056 A1 | 9/1997 |
| WO | 2004085152 A1 | 10/2004 |
| WO | 2010044728 A1 | 4/2010 |
| WO | WO2010044728 | 4/2010 |
| WO | 2012134374 A1 | 10/2012 |

OTHER PUBLICATIONS

European Seach Report for Application No. 13872425.7 dated Sep. 12, 2016.

International Search Report for PCT/SE2013/051409 dated May 7, 2014.

International Preliminary Search Report on Patentability for PCT/SE2013/051409 dated Aug. 6, 2015.

Chinese Office Action dated Apr. 6, 2017 for Chinese Application No. 201380071666.X.

* cited by examiner

MACHINE AND MANUFACTURING METHOD FOR BUILDING BOARD

CROSS REFERENCE TO RELATED APPLICATION(S)

This application claims priority to and is a national stage application of PCT Application No. PCT/SE2013/051409 filed Nov. 28, 2013 and claims priority to Swedish Application No: 1350085-5 filed Jan. 28, 2013; the contents of both of which are also incorporated herein by reference.

FIELD OF THE INVENTION

The present invention relates generally to manufacturing of building boards for paneling inside and on the exterior of buildings, such as on inner walls, floors, ceilings and facades.

BACKGROUND OF THE INVENTION

Today, there are many solutions for mounting paneling, e.g. in the form of wood panels and similar on the walls of a house. Moreover, there are established methods for mounting other kinds of paneling in a room, such as boards of plaster, wood fiber or laminated wood. The latter methods have in common that they require particular measures for accomplishing nice looking joints between the included wall elements. It has proven to be especially challenging to combine an aesthetically appealing appearance of the finished wall with a cost-efficient manufacturing of the paneling elements, and at the same time, allow simple mounting.

For example, WO 2010/044728 discloses a method for producing a building board, wherein a first armoring layer is arranged on a flat base. Thereafter, edge stripes are arranged preferably along two opposite sides of the armoring layer and a volume between the edge stripes is filled with a hardenable mass, such as plaster. A second armoring layer is then arranged on top of the hardenable mass, where after said mass is hardened. As a result, a building board is obtained that has integrated edge stripes, which preferably are adapted to allow efficient interconnection of two or more building boards onto a supporting structure, such as along a wall of a house.

The above-mentioned solution for manufacturing building boards renders it possible to accomplish boards for paneling floors, ceilings or walls, which boards provide aesthetically appealing joints and are robust from a design point-of-view. The manufacturing method, however, is relatively inefficient in terms of expenditure of time and cost.

SUMMARY OF THE INVENTION

The object of the present invention is therefore to provide a solution through which body elements for building boards can be finished in a cost-efficient and uncomplicated manner, and the resulting building boards may be mounted onto a support structure in a straightforward way, for example by screw-free snapping into one another.

According to a first aspect of the invention, the object is achieved by the machine described initially, wherein the first processing station includes laterally operating processing means configured to, by gluing, apply a first edge strip of the body element in such a manner that the first edge strip is brought in parallel with the primary main side. A second processing station includes vertically operating processing means configured to apply, by gluing, a primary surface layer, which covers the entire primary main side and the primary side of the first edge stripe. In the second processing station a vertical pressure is also applied over the body element and the first edge stripe across the working direction while the body element and the first edge stripe pass the second processing station. The vertical pressure is applied in such a manner that the primary side of the first edge stripe is brought in level with the primary main side of the body element when passing through the second processing station.

This machine is advantageous because it ensures that the edge stripe mounted onto the body element becomes fully parallel to the body element along its primary side. Thereby, a smooth and aesthetically appealing surface is obtained, which is covered by a primary surface layer, for example in the form of a wall paper. The building board is thus suitable for direct mounting on an inner wall of a house.

According to one embodiment of this aspect of the invention, the laterally operating processing means in the first processing station are further configured to apply, by gluing, a second edge stripe along a second edge side of said four edge sides. The second edge side is opposite to the first edge side, and the second edge stripe is applied in such a manner that a primary side of the second edge stripe is brought in parallel with the primary main side. Moreover, the vertically operating processing means in the second processing station are further configured to apply, by gluing, the primary surface layer such that it covers the entire primary main side, the primary side of the first edge stripe and the primary side of the second edge stripe. After application of the primary surface layer, the laterally operating processing means of the second processing station are configured to apply a pressure over the body element, the first edge stripe and the second edge stripe across the working direction of the conveyor line while the body element, the first edge stripe and the second edge stripe pass the second processing station. Here, the vertical pressure results in that both the primary side of the first edge stripe and the primary side of the second edge stripe are brought in level with the primary main side when passing through the second processing station. It is thereby guaranteed that both edge stripes become fully parallel to the body element along its primary main side, and that the resulting building board obtains a smooth and aesthetically appealing surface, which renders it adapted for sequential direct mounting on a support structure, for example where a second building board is snapped into a first building board, a third building board is snapped into the second building board and so on. The first edge stripe may thus be of so-called female type and the second edge stripe of so-called male type.

According to another embodiment of this aspect of the invention, the first processing station includes at least one first control roll and at least one second control roll, which are arranged to, while the body element and the first edge stripe attached thereto, pass the first processing station, apply a lateral pressure over the body element and the first edge stripe across the working direction of the conveyor line. The inner measure between the control rolls corresponds to a desired width dimension of a finished building board, which results in that this dimension can be given a very exact measure.

Provided that both a first and a second edge stripe have been applied on the body element, the first and second control rolls are arranged to, while passing the body element and the edge stripes attached thereto through the first processing station, apply a lateral pressure over the body element, the first edge stripe and the second edge stripe across the working direction of the conveyor line, wherein an inner measure between the control rolls corresponds to a desired width of a finished building board. Such an adaptation is highly advantageous if it is intended to mount the building boards sequentially onto a support structure, since it is thereby possible to avoid error propagation due to any varying widths of the building boards and/or because the edges of the building boards are not parallel to one another.

According to yet another embodiment of this aspect of the invention, a third processing station in the machine includes vertically operating processing means configured to, by gluing, apply a secondary surface layer, which covers the entire secondary main side and a secondary side of the first edge stripe. Thus, the durability of the first edge stripe's attachment to the body element increases. Further, the secondary side of the building board is given a more appealing appearance. If also a second edge stripe has been applied to the body element, it is advantageous if the vertically operating processing means in the third processing station are configured to, by gluing, apply the secondary surface layer, such that this covers the entire secondary main side, a secondary side of the first edge stripe and a secondary side of the second edge stripe.

According to a further embodiment of this aspect of the invention, the vertically operating processing means in the second processing station include first and second pressing rolls, which are configured to engage against the primary and the secondary main sides respectively. Moreover, each of the first and second pressing roll here has a rotation axis which is essentially perpendicular to the working direction of the conveyor line. Further, each of the first and second pressing roll has a length exceeding a width of a finished building board. This is advantageous because then it is possible to process the entire profile of the building board in a uniform manner.

According to a further embodiment of this aspect of the invention, the rotation axis of the first pressing roll is rigidly attached in the machine and consists of a hard and relatively non-elastic material. The second pressing roll is radially flexible, such that a distance between the periphery of the second pressing roll and the periphery of the first pressing roll is adaptable to a thickness of an object which passes through the first and second pressing rolls. Consequently, any variations in the body element thickness as well as between the first and/or the second edge stripe and the body element can be handled. Additionally, the building board and its primary surface layer may preferably be oriented in such a manner that the primary surface layer engages against the first, rigid and hard pressing roll. Namely, this results in that any irregularities in the finished building board due to thickness variations are located to its secondary main side.

The second pressing roll may include a core of a relatively hard material, which is covered by a resilient material (such as textile) arranged to engage against said building board while passing the same between the first and second pressing rolls. Alternatively, the second pressing roll may contain a set of resilient discs, which are arranged along the rotation axis of the second pressing roll. Each resilient disc here has segment width and an individually variable radius adaptable to the thickness of an object passing between the disc and the first pressing roll. Thereby, the second pressing roll is radially flexible in units corresponding to the segment width of each disc in the set of resilient discs, which is an efficient and reliable way to accomplish the desired flexibility of the second pressing roll.

According to yet another embodiment of this aspect of the invention, a fourth processing station in the machine includes cutting means configured to, after application of the primary surface layer on the primary main side, by cutting, adapt the primary surface layer across the working direction of the conveyor line, such that the extension of the primary surface layer matches the width of a finished building board. Thereby, it is guaranteed that the primary surface layer covers exactly the desired surface of the building board, and an aesthetically appealing product can be obtained.

According to a second aspect of the invention, the object is attained by the method described initially, wherein a first edge stripe is applied by gluing along a first edge side of the body element in such a manner that a primary side of the first edge stripe is brought in parallel with the primary main side. Thereafter, a primary surface layer is applied, by gluing, which covers the entire primary main side and the primary side of the first edge stripe, where after a vertical pressure is applied over the body element and the first edge stripe across the working direction of the conveyor line during transport of the body element and the first edge stripe along the working direction of the conveyor line. The vertical pressure results in that the primary side of the first edge stripe is brought in level with the primary main side of the body element. The advantages of this method, as well as the preferred embodiments thereof, are apparent from the discussions above with reference to the proposed building board.

SHORT DESCRIPTION OF THE DRAWINGS

The present invention will now be explained in further detail through embodiments, which are described as examples, and with reference to the attached drawings.

PREFERRED EMBODIMENTS OF THE INVENTION

Figure 1:
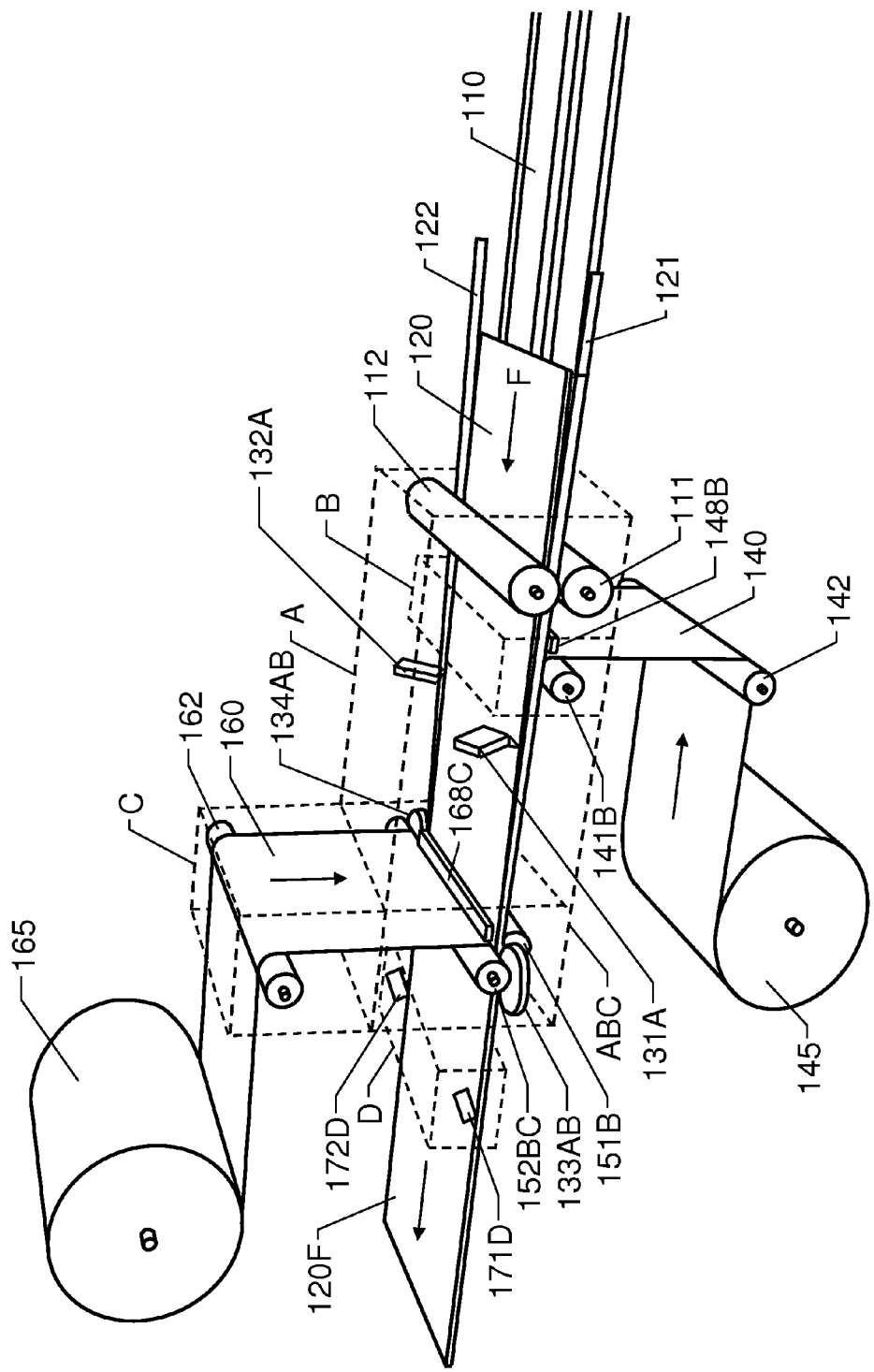
FIG. 1 shows an overview of a machine according to one embodiment of the invention.

Initially, we refer to FIG. 1, which shows an overview of a machine according to one embodiment of the invention for finishing body elements 120 for building boards. Here, each body element 120 essentially has the shape of a cuboid including a primary main side and a secondary main side opposite thereto, each with a relatively large delimitation area plus four edge sides of relatively small delimitation area.

The machine includes a conveyor line 110 configured to receive incoming body elements 120, for example between first and second receiving rolls 111 and 112 respectively, and moving the body elements 120 in a working direction F along a set of processing stations A, B, C and D respectively. Each processing station here has a particular function. For implementing reasons, however, some of these functions are integrated into one another, which is the reason why the volumes of the machine that correspond to the designations of the processing stations A, B, C and D partially overlap each other.

A first processing station A contains laterally operating processing means configured to apply, by gluing, a first edge stripe 121 along a first edge side of said four edge sides in such a manner that a primary side of the first edge stripe 121 is brought to be parallel with the primary main side of the body element. The laterally operating processing means in the first processing station A preferably include at least one gluing device 131A and at least one first control roll 134A and at least one second control roll 134A, which control rolls are arranged to, while the body element 120 and the edge stripe 121 attached thereto pass, apply a lateral pressure over the body element 120 and the first edge stripe 121 across the working direction F of the conveyor line 110. This pressure fixates the first edge stripe 121 at the body element 120. Moreover, an inner measure between the control rolls 132A and 134A corresponds to a width dimension of a finished building board 120F. This is desirable because the building boards can be produced with very low tolerances and thereby also the risk of error propagation when mounting two or more building boards onto a supporting structure.

Figure 2:
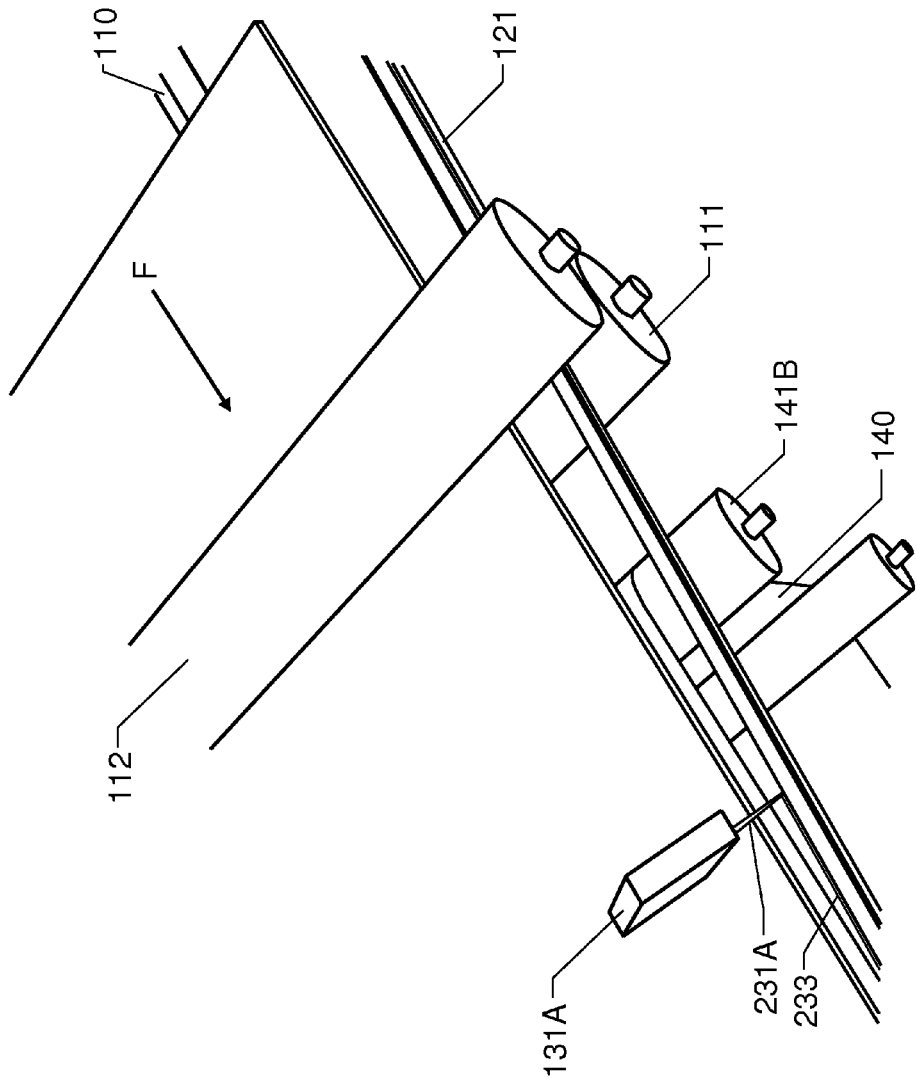
FIG. 2 illustrates how an edge stripe is glued onto a body element according to one embodiment of the invention.

FIG. 2 illustrates how a first edge stripe 121 is glued onto the body element 120 according to one embodiment of the invention. The edge stripe 121 is gradually inserted parallel to the body element 120. In connection with this, a gluing device 131A is configured to apply glue via a nozzle 213A on at least one of the first edge side of the body element 120 and a side the first edge stripe 121 which is directed towards the first edge side. The machine may also include a distance means arranged to accomplish a desired column between the edge stripe 121 and the body element 120 to provide space for the nozzle 231A.

A second processing station B includes vertically operating processing means 141B, 151B, 152C and 148B configured to apply a primary surface layer 140 on the building board. Specifically, the primary surface layer 140 is applied by gluing, such that it covers the entire primary main side and the primary side of the first edge stripe 121. The machine suitably includes a vertically operating processing means 141B, which is configured to, after gluing, apply the primary surface layer 140 on the body element 120 and the first edge stripe 121 attached thereto in connection with the transport through the second processing station B. A required amount of glue is here applied on the body element 120 and the first edge stripe 121 and/or the primary surface layer 140 via gluing means 148B. In the orientation illustrated in FIG. 1 it is most straightforward to apply glue on the primary surface layer 140, which for example can be in the form of a wall paper or fine meshed weave, is suitably stored on a roll 145 and can be provided to the second processing station B via one or more runners 142.

After having applied the primary surface layer 140 a vertical pressure is applied over the body element 120 and the first edge stripe 121 across the working direction F of the conveyor line 110 while the body element 120 and the first edge stripe 121 pass through the second processing station B. The pressure is applied in such a manner that the primary side of the first edge stripe 121 is brought in level with the primary main side when passing the second processing station B. This, in turn, can be accomplished by the vertically operating processing means in the second processing station B comprising pressing rolls 151B and 152BC respectively, which are configured to engage against the primary and the secondary sides respectively of the body element 120. Both rolls 151B and 152BC have a rotation axis, which is essentially perpendicular to the working direction F of the conveyor line 110 and each roll 151B and 152BC preferably has a length exceeding a width of a finished building board 120F.

Figure 3:
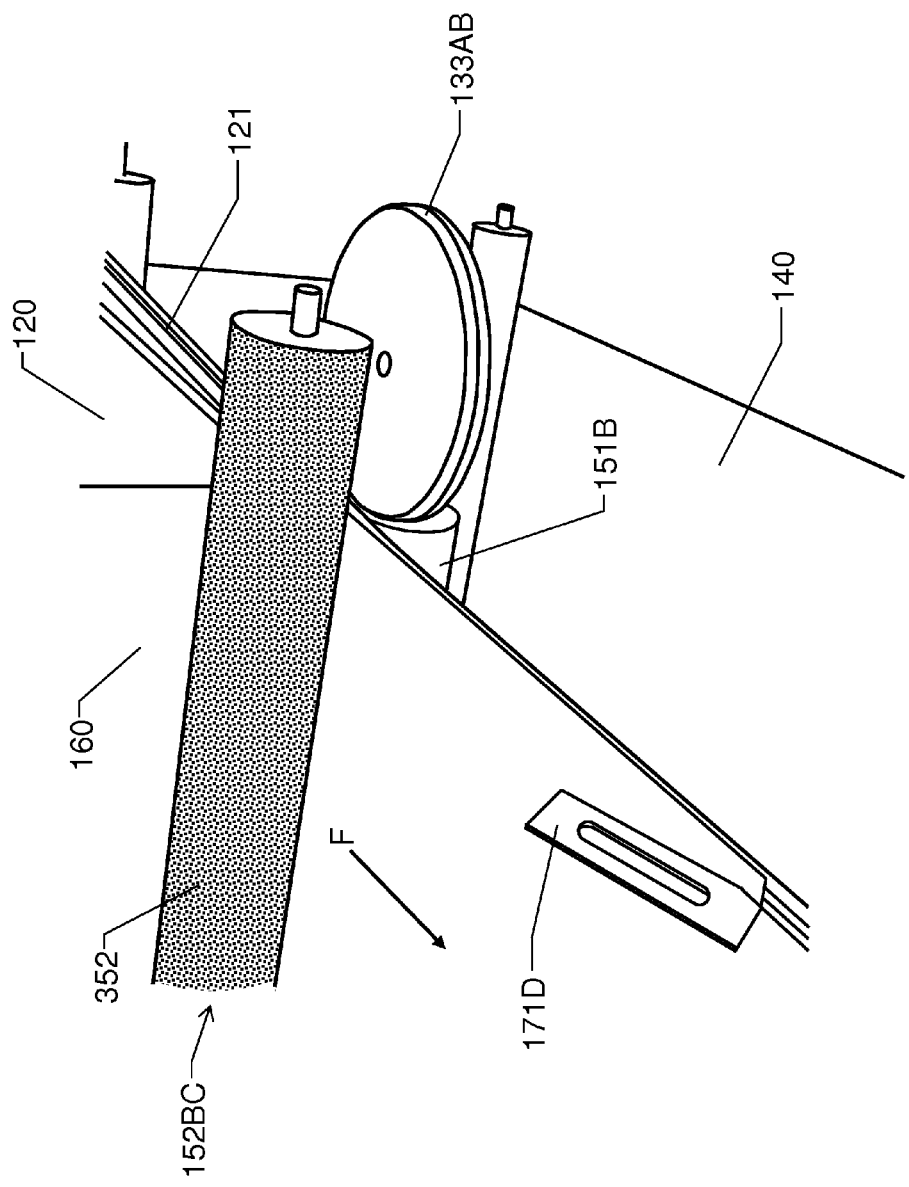
FIG. 3 illustrates how a vertical pressure is applied over a body element and an edge stripe and how an applied surface layer is cut according to one embodiment of the invention.
Figure 4:
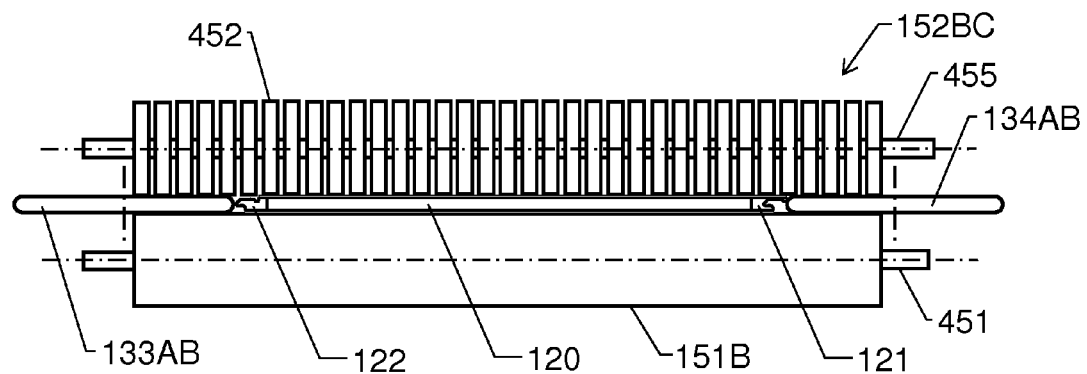
FIG. 4 shows a side view of some details in FIG. 3 according to a first embodiment of the invention.

FIGS. 3 and 4 show how the pressing rolls 151B and 152BC may be arranged according to embodiments of the invention. A rotation axis 451 of a first pressing roll 151B is here rigidly attached to the machine and the first pressing roll suitably consists of a hard and relatively non-elastic material, such as steel. A second pressing roll 152BC is however radially flexible. This means that a distance between the periphery of the second pressing roll 152BC and the periphery of the first pressing roll 151B is adaptable to a thickness of an object which passes through the first and second pressing rolls 151B and 152BC, such as a body element 120 and any edge stripes 121 and/or 122 attached thereto, a primary surface layer 140 and any secondary surface layer 160 (see below).

According to one embodiment of the invention, the second pressing roll 152BC includes a core of a relatively hard material, such as steel. The core, in turn, is covered by a resilient material 352, which is arranged to engage against the building boards when these pass between the first pressing roll 151B and the second pressing roll 152BC. The building boards here include a body element 120, at least one edge stripe 121 and/or 122 and a primary surface layer 140. If a building board is provided with a secondary surface layer 160 it is preferable that this is applied in connection with the building board passing the pressing rolls 151B and 152BC. The resilient material may preferably be composed of textile, for example in the form of a carpet of suitable thickness.

According to another embodiment of the invention, the second pressing roll 152BC includes a set of resilient discs 452, which are arranged along the rotation axis 455 of the second pressing roll 152BC. Each resilient disc 452 here has a segment width and an individually variable radius adaptable to the thickness of an object passing between the first pressing roll 151B and the disc 452. In other words, the second pressing roll 152BC is radially segment-wise flexible in units corresponding to the segment width of each disc 452.

Of course, the mutual relation between the first pressing roll 151B and the second pressing roll 152BC may be the opposite, i.e. such that the first pressing roll 151B is on top, the second pressing roll 152BC is at the bottom and the building boards are transported with the primary side upwards through the machine. Such an arrangement is however generally less advantageous because then the pressing rolls 151B and 152 BC respectively also need to overcome gravity with respect to the weight of the building board.

According to one embodiment of the invention, the laterally operating processing means 131A, 132A, 133AB and 134AB in the first processing station A are also configured to apply, by gluing, a second edge stripe 122 along a second edge side of said edge sides of the building board 120. The second edge stripe 122 is applied in a manner corresponding to what has been described above, i.e. such that a primary side of the secondary edge stripe 122 is brought to be parallel with the primary main side of the body element 120. The vertically operating processing means 151B, 152BC and 148B in the second processing station B are therefore further configured to apply, by gluing, the primary surface layer 140 such that it covers the entire primary main side of the body element 120, the primary side of the first edge side 121 and the primary side of the second edge stripe 122.

Thereafter, via the vertically pressing rolls 151B and 152BC, a pressure is applied over the body element 120, the primary side of the first edge side 121 and the primary side of the second edge stripe 122 across the working direction F of the conveyor line 110 while the body element 120, first edge side 121 and the second edge stripe 122 pass the second processing station B in such a manner that both the primary side of the first edge stripe 121 and the primary side of the second edge stripe 122 are brought in parallel with the primary main side when passing the second processing station B.

Figure 5:
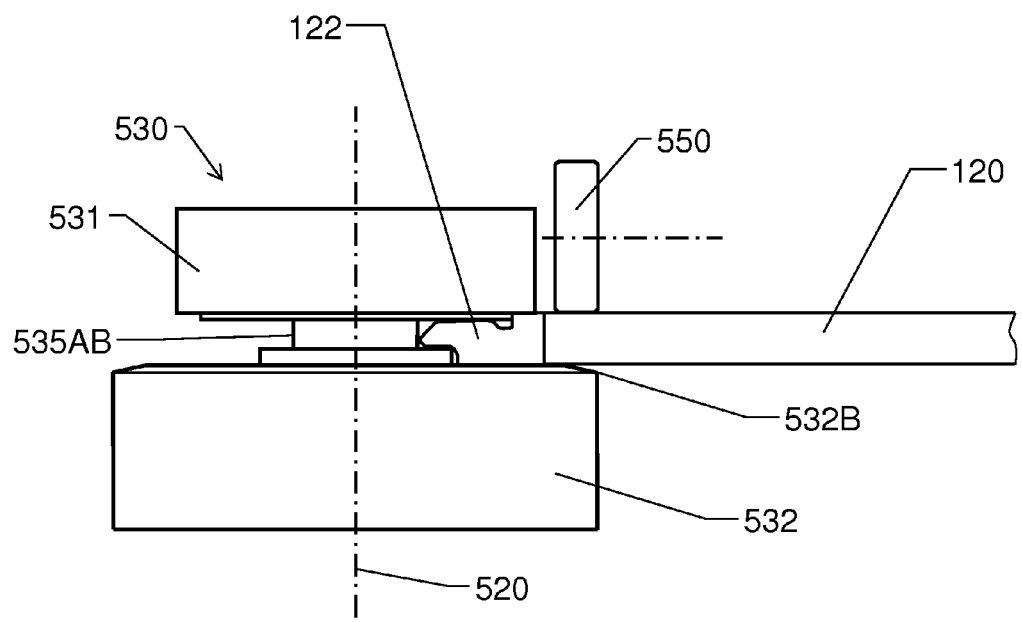
FIG. 5 shows a side view over a second processing station according to a second embodiment of the invention.

FIGS. 3 and 4 show an embodiment of the invention, where the first vertically pressing roll 151B, the second pressing roll 152BC and the laterally operating processing means 133AB are all located at essentially the same position at the conveyor line 110. FIG. 5 shows another embodiment of the invention, where instead the vertically operating processing means act on the building board downstream of the point on the conveyor line 110 where the laterally operating processing means instead act against the edge stripe 122 and the body element 120.

In FIG. 5, a roll 530 represents a laterally operating processing means. The roll 530 also has a vertically steering function, and therefore shows different diameters along its central axis 520, so the edge stripe 122 is steered to be applied against the body element 120 while these two elements are transported pass the roll 530 along the conveyor line 110. Specifically, a lower segment 532 of the roll 530 has a diameter measure, which is adapted such that an upper ledge of the lower segment 532 can support the edge strip 122 as well as an outer edge of the body element 120. A mid segment 535AB of the roll 530 has a diameter measure, which is smaller than that of the lower segment 532 and is adapted so that at least one surface of the mid segment, which is essentially parallel with the central axis 520, engages at pressure against the edge stripe 122 when this and the body element 120 are transported pass the roll 530. An upper segment 531 of the roll 530 has a diameter measure, which exceeds that of the mid segment 535AB and is adapted so that a lower ledge of the upper segment 531 steers the edge stripe 122 in such a manner that the primary side of the edge stripe 122 is brought in level with the primary main side of the body element 120.

To ensure that the primary side of the edge stripe 122 is positioned correctly in relation to the primary main side of the body element 120 an assisting press wheel 550 is preferably arranged with a rotation axis essentially parallel with the working direction F and at a position of the conveyor line 110, such that the outer edge of the body element 120 is steered in on an adequate level relative to how the roll 530 steers the edge stripe 122. It is further advantageous if the lower segment 532 is provided with a bevel 532B to facilitate steering in of a front edge of the body element 120 between the lower ledge of the upper segment 531 and above the upper ledge of the lower segment 532 when the body element 120 is fed forward against the roll 530 along the conveyor line 110.

According to this embodiment of the invention, one or more surface layers are thereafter applied, by gluing, by vertically operating processing means according to what has been described above. The surface layer is applied such that it covers the entire primary main side of the body element 120 and the primary side of the edge stripe 122. In a processing station downstream of the roll 530 (not shown) a vertical pressure is then applied over the body element 120 and the edge stripe 120 across the working direction F of the conveyor line 110 while the body element 120 and the edge stripe 122 pass this processing station in such a manner that the primary side of the edge stripe 122 is finally brought in line with the primary main side with respect to both level and angle.

FIG. 1 also shows a roll 165, which stores a secondary surface layer 160. According to embodiments of the invention, a third processing station C includes vertically operating processing means 152BC and 168C configured to, by gluing, apply a secondary surface layer 160, which covers the entire secondary main side of the body element 120 and a secondary side of the first edge stripe 121 plus in case a second edge stripe 122 has been applied, also a secondary side of the second edge stripe 122. The secondary surface layer 160, which for example may be composed of a protecting and/or reinforcing weave, is suitably provided to the third processing station C via one or more runners 162. Gluing means 168C are suitably arranged to apply an adequate amount of glue on the body element 120 and the first edge stripe 121 and/or on the secondary surface layer 160.

FIG. 3 shows how an applied surface layer 140 and/or 160, in a fourth processing station D, is cut according to an embodiment of the invention. According to this embodiment, at least one cutting means 171D (and 172D in FIG. 1) is configured to, after application of the primary surface layer 140 on the primary main side of the body element 120 (and after application of a possible secondary surface layer 160 on the secondary main side), by cutting, adapt the surface layer 140 and/or 160 across the working direction F of the conveyor line 110, such that the extension of the surface layer matches the width of a finished building board 120F. For illustrating purposes FIG. 3 shows a cutting means 171D placed above the building board, i.e. in connexion with the side which is covered by the secondary surface layer 160. However, it is most suitable to cut the primary surface layer 140 from the opposite main side of the building board (i.e. from below in FIG. 3).

The above-described functioning of the machine is preferably controlled by software/computer program in the form of a set of computer program instructions, which are stored in a memory unit in communicative connection with a control unit in the machine.

Figure 6:
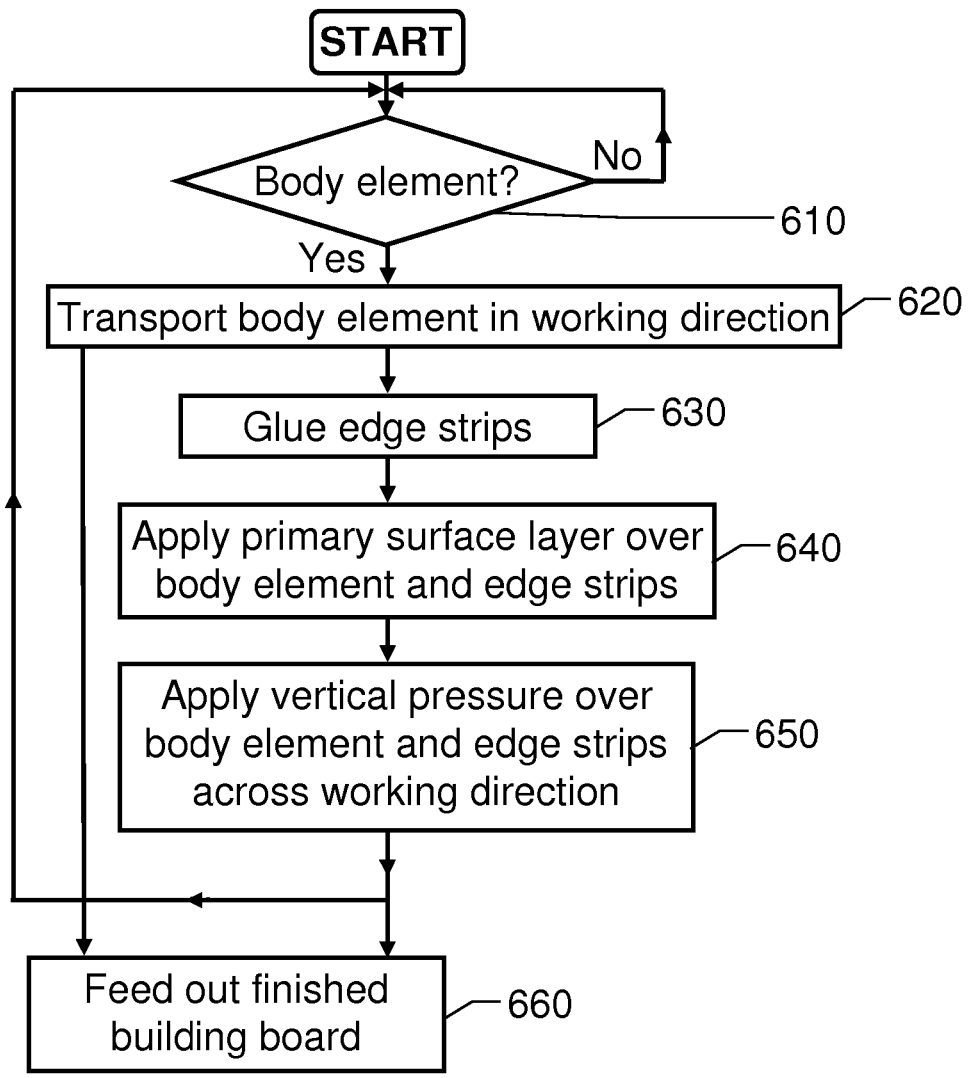
FIG. 6 shows flow diagram over the general method according to the invention.

In order to sum up, we will now describe the general method according to the invention for finishing body elements to building boards with reference to the flow diagram in FIG. 6.

In a first step 610 it is investigated if a body element 120 (in the form of a cuboid including a primary main side and a secondary main side opposite thereto each having a relatively large delimitation area and four edge sides with relatively small delimitation area) has been received on the conveyor line 110 of the machine. If so, a step 620 follows. Otherwise, the procedure loops back and stays in step 610.

In step 620, the conveyor line 110 moves the body element 120 in a working direction pass a set of processing stations. This movement takes place throughout the machine, which is symbolized by an arrow running in parallel with subsequent steps 630, 640 and 650 to a terminating step 660.

In the following step 630, a first edge stripe 121 is applied, by gluing, along a first edge side of the body element 120 in such a manner that a primary side of the first edge stripe 121 is brought to be parallel with the primary main side of the body element 120. Thereafter, a primary surface layer 140 is applied, by gluing, such that it covers the entire primary main side of the first edge stripe 121.

Then, in a step 650, a vertical pressure is applied over the body element 120 and the first edge stripe 121 across the working direction of the conveyor line 110 while the body element 120 and the first edge stripe 121 are transported along the working direction of the conveyor line (110). The primary side of the first edge stripe 121 is thereby brought in level with the primary main side of the body element 120. In a step 660 thereafter, a finished building board is fed out from the machine, and the procedure loops back to step 610 to investigate if a new body element has been received.

The steps described above with reference to FIG. 6 may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The invention is not restricted to the described embodiments in the figures, but may be varied freely within the scope of the claims.

The invention claimed is:

1. A machine for finishing building boards which are essentially shaped as cuboids including a primary main side and opposite thereto a secondary main side each having a relatively large delimitation area and four edge sides with relatively small delimitation area, the machine comprising:
   a conveyor line configured to receive incoming body elements for building boards and transport the body elements in a working direction along a set of processing stations in the machine;
   a first processing station of said processing stations comprises laterally operating processing means configured to, by gluing, apply a first edge strip along a first edge side of said four edge sides in such a manner that the first edge strip is brought in parallel with the primary main side; and
   a second processing station of said processing stations comprises vertically operating processing means, said vertically operating processing means comprising:
   first and second pressing rolls which are configured to engage against the primary and the secondary main sides respectively, each of the first and second pressing rolls having a rotation axis which is essentially perpendicular to the working direction of the conveyor line, and each of the first and second pressing rolls having a length exceeding a width of a finished building board,
   wherein the rotation axis of the first pressing roll is rigidly attached in the machine, the first pressing roll consists of a hard and relatively non-elastic material and the second pressing roll being radially flexible, such that a distance between the periphery of the second pressing roll and the periphery of the first pressing roll is adaptable to a thickness of an object which passes through the first and second pressing rolls, and
   wherein the second pressing roll comprises a set of resilient discs arranged along the rotation axis of the second pressing roll, each resilient disc having a segment width and an individually variable radius adaptable to the thickness of an object passing between the disc and the first pressing roll, such that the second pressing roll is radially adaptable in segments in units corresponding to the segment width of each disc in the set of resilient discs, and
   said vertically operating processing means configured to:
   apply, by gluing, a primary surface layer which covers the entire primary main side and the primary side of the first edge stripe, and thereafter
   apply a vertical pressure over the body element and the first edge stripe across the working direction while the body element and the first edge stripe pass the second processing station in such a manner that the primary side of the first edge stripe is brought in level with the primary main side of the body element when passing through the second processing station.

2. The machine according to claim 1, wherein
the laterally operating processing means in the first processing station are further configured to apply, by gluing, a second edge stripe along a second edge side of said four edge sides, which second edge side is opposite to the first edge side, and the second edge stripe is applied in such a manner that a primary side of the second edge stripe is brought in parallel with the primary main side; and
the vertically operating processing means in the second processing station are further configured to:
apply, by gluing, the primary surface layer such that it covers the entire primary main side, the primary side of the first edge stripe and the primary side of the second edge stripe, and thereafter
apply a pressure over the body element, the first edge stripe and the second edge stripe across the working direction of the conveyor line while the body element, the first edge stripe and the second edge stripe pass the second processing station in such a manner that both the primary side of the first edge stripe and the primary side of the second edge stripe are brought in level with the primary main side when passing through the second processing station.

3. The machine according to claim 2, wherein a third processing station of said processing stations comprises vertically operating processing means configured to, by gluing, apply a secondary surface layer which covers the entire secondary main side and a secondary side of the first edge stripe.

4. The machine according to claim 2, wherein the first processing station comprises at least one laterally operating processing means in the form of a roll which has a vertically controlling function, shows different diameter measures along a central axis, and is configured to control the edge stripe and be applied against the body element while the edge stripe and the body element are transported past the roll along the conveyor line.

5. The machine according to claim 4, wherein a fourth processing station of said processing stations comprises cutting means configured to, after application of the primary surface layer on the primary main side, by cutting, adapt the primary surface layer across the working direction of the conveyor line, such that the extension of the primary surface layer matches the width of a finished building board.

6. The machine according to claim 2, wherein the first processing station comprises at least one first control roll and at least one second control roll which control rolls are arranged to, while the body element, the first edge stripe attached thereto, and the second edge stripe attached thereto pass the first processing station, apply a lateral pressure over the body element, the first edge stripe and the second edge stripe across the working direction of the conveyor line, wherein an inner measure between the control rolls corresponds to a desired width of a finished building board.

7. The machine according to claim 6, wherein a third processing station of said processing stations comprises vertically operating processing means configured to, by gluing, apply a secondary surface layer which covers the entire secondary main side, a secondary side of the first edge stripe and a secondary side of the second edge stripe.

8. The machine according to claim 1, wherein the first processing station comprises at least one first control roll and at least one second control roll, which control rolls are arranged to, while the body element and the first edge stripe attached thereto, pass the first processing station, apply a lateral pressure over the body element and the first edge stripe across the working direction of the conveyor line, wherein an inner measure between the control rolls corresponds to a desired width dimension of a finished building board.

9. The machine according to claim 1, wherein the second pressing roll comprises a core of a relatively hard material, which core is covered by a resilient material arranged to engage against said building board while passing the same between the first and second pressing rolls.

* * * * *